US012227896B2

(12) United States Patent
Shim et al.

(10) Patent No.: US 12,227,896 B2
(45) Date of Patent: Feb. 18, 2025

(54) METHOD OF MANUFACTURING YOGA OUTER SOCKS WITH SILICONE BAND ATTACHED THERETO

(71) Applicants: ONDO Inc., New York, NY (US); J-FASHION CO., LTD, Jeollabuk-do (KR)

(72) Inventors: Tonghyun Shim, New York, NY (US); Jin Yeol Jeong, Jeollabuk-do (KR)

(73) Assignees: ONDO INC., New York, NY (US); J-FASHION CO., LTD, Jeollabuk-Do (KR)

(*) Notice: Subject to any disclaimer, the term of this patent is extended or adjusted under 35 U.S.C. 154(b) by 556 days.

(21) Appl. No.: 17/513,724

(22) Filed: Oct. 28, 2021

(65) Prior Publication Data

US 2022/0127782 A1    Apr. 28, 2022

(30) Foreign Application Priority Data

Oct. 28, 2020   (KR) .......................... 10-2020-0141090

(51) Int. Cl.
  *D06M 14/30*   (2006.01)
  *B29C 65/08*   (2006.01)
  *B29L 23/00*   (2006.01)

(52) U.S. Cl.
  CPC ............. *D06M 14/30* (2013.01); *B29C 65/08* (2013.01); *B29L 2023/00* (2013.01); *D06M 2200/50* (2013.01); *D10B 2501/021* (2013.01)

(58) Field of Classification Search
  None
  See application file for complete search history.

(56) References Cited

U.S. PATENT DOCUMENTS 9,609,896 B2 *   4/2017   Crosby .................. A43B 13/22

FOREIGN PATENT DOCUMENTS

KR       101284247 B1 *   7/2013
KR       20210110101 A *   9/2021

OTHER PUBLICATIONS

KR20210110101A_machine_translation (Year: 2021).*
KR101284247B1_machine_translation (Year: 2013).*

* cited by examiner

Primary Examiner — Michael N Orlando
Assistant Examiner — Abhishek A Patwardhan
(74) Attorney, Agent, or Firm — IP & T GROUP LLP

(57) ABSTRACT

Disclosed is a method of manufacturing yoga outer socks with a silicone band attached thereto by forming a temporary connection part using ultrasonic waves without a seam between an outer sock upper and a sole part, adhering hot melt to the temporary connection part via heat fusion, and then fusing a silicone band onto hot melt to prevent slipping of the heel. Accordingly, the yoga outer socks are manufactured by forming a temporary connection part with ultrasonic waves without a seam and then adhering hot melt to the temporary connection part via heat fusion to simplify manufacturing processes and to achieve excellent productivity.

3 Claims, 7 Drawing Sheets

(a)

(b)

METHOD OF MANUFACTURING YOGA OUTER SOCKS WITH SILICONE BAND ATTACHED THERETO

CROSS-REFERENCE TO RELATED APPLICATION

This application claims priority to and the benefit of Korean Patent Application No. 10-2020-0141090, filed on Oct. 28, 2020, the disclosure of which is incorporated herein by reference in its entirety.

BACKGROUND OF THE INVENTION

1. Field of the Invention

The present invention relates to a method of manufacturing yoga outer socks with a silicone band attached thereto, and more particularly to a method of manufacturing yoga outer socks with a silicone band attached thereto by forming a temporary connection part using ultrasonic waves without a seam between an outer sock upper and a sole part, adhering hot melt to the temporary connection part via heat fusion, and then fusing a silicone band onto hot melt to prevent slipping of the heel.

2. Description of the Related Art

In general, the foot is a part of the body that maintains balance of the human body and absorbs shock by supporting a body weight and is the part through which numerous blood vessels and nerves pass and that needs to be maintained at an appropriate temperature for smooth blood circulation.

In order to protect and insulate the feet, socks, stockings, extra socks, or outer socks (hereinafter collectively referred to as "foot clothing") are used.

The outer socks of the foot clothing are made of fibers such as nylon or cotton, which have elasticity, and have excellent elasticity and ventilation, and thus women can easily wear the outer socks indoors in their daily lives.

These outer socks are made by sewing a number of patterns, which are woven with elastic fibers such as nylon and cover the soles, insteps, and heels, with elastic threads, and a rubber band is installed around openings of the outer socks with sewing threads to prevent the outer socks from coming off.

That is, in the conventional outer socks, a plurality of pattern pieces such as a sole cover pattern, a toe cover pattern, and a heel cover pattern are sewn and connected or an edge of the sole cover pattern is connected to a pattern formed by integrating the toe and heel cover patterns by stitching superimposed pattern parts together, and an elastic rubber band such as rubber is attached to openings of the extra socks, which are formed by stitching, by stitching the elastic rubber band with a sewing thread.

In the conventional outer socks, each pattern is sewn and connected, and thus a thick or convex sewing line is formed in a region in which patterns are connected, and when the outer socks are worn on the foot, the sewing line applies pressure to the foot, and thus there is a problem of poor fit.

Recently, use of outer socks has been subdivided, and various outer socks have been developed, such as outer socks for yoga in which the toes are open, and outer socks for protecting the ankles.

Since these subdivided outer socks are of limited use, if the outer socks are damaged, the outer socks cannot be reused and need to be discarded.

CITED REFERENCE

Patent Document

Korean utility model registration No. 0199775

SUMMARY OF THE INVENTION

Therefore, the present invention has been made in view of the above problems, and it is an object of the present invention to provide a method of manufacturing yoga outer socks with a silicone band attached thereto by forming a temporary connection part using ultrasonic waves without a seam between an outer sock upper and a heel part and between the outer sock upper and a sole part, and adhering hot melt to the temporary connection part via heat fusion, thereby simplifying manufacturing processes.

It is another object of the present invention to provide a method of manufacturing yoga outer socks with a silicone band attached thereto by forming an opening hot melt on an outer sock opening formed on an outer sock upper and fusing a silicone band onto the opening hot melt to prevent slipping of the heel and to prevent the outer socks from coming off.

It is yet another object of the present invention to provide a method of manufacturing yoga outer socks with a silicone band attached thereto for preventing a temporary connection part from being easily opened or torn by forming the temporary connection part between the outer sock upper and the sole part and then forming overlock on the temporary connection part.

In accordance with the present invention, the above and other objects can be accomplished by the provision of a method of manufacturing yoga outer socks with a silicone band attached thereto, including separately cutting S10 an outer sock upper 30 including an instep part 10, a sole part 40, an instep cover 12 for reinforcing the instep part 10, and an anti-slip pad using fabric, reinforcing and adhering S20 the instep cover 12 to the instep part 10 of an outer sock upper 30 to be superimposed, forming S30 an opening hole 11 in the instep cover 12 adhered to the instep part 10 to fit a toe thereinto, attaching S40 at least one anti-slip pad to one surface of the sole part 40 to be in contact with a heel part and a toe part of a sole by fusing the anti-slip pad to the one surface of the sole part 40 using ultrasonic waves, forming S50 a first temporary connection part 50a by adhering ends of the foot side part 20 of the outer sock upper 30 to fuse the ends to the heel part 21 using ultrasonic waves while melting and cutting a superimposed part of the ends by oscillating ultrasonic waves by putting a structure in which the ends of the foot side part 20 are partially superimposed into an ultrasonic adapter, forming S60 an outer sock opening 80 by attaching hot melt to an upper edge of a foot side part, forming S70 an outer sock body by putting the outer sock upper 30 above the sole part 40 and fusing a resulting structure using ultrasonic waves, attaching S80 hot melt to the first temporary connection part 50a formed on the heel part 21 of the outer sock upper 30 and the second temporary connection part 50b formed on the outer sock upper 30 and the sole part 40 to reinforce the first temporary connection part 50a and the second temporary connection part 50b, and fusing S90 a silicone band to the heel part of an opening hot melt 62 of the outer sock upper 30.

The method may further include stacking the outer sock upper 30 on an upper surface of the sole part 40 to fuse a resulting structure and forming an overlock on a fused part to strongly fix the sole part and the outer sock upper.

The method may further include attaching an elastic band to an upper part of the toe part of the outer sock upper 30 via heat pressurization to be elastically extended and contracted and to simultaneously prevent the yoga outer socks from easily coming off.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The following objects, other objects, features, and advantages of the present invention will be readily understood through the following exemplary embodiments associated with the accompanying drawings. However, the present invention is not limited to the embodiments described herein and may be embodied in other forms.

Rather, the embodiments stated herein are provided so that the disclosed subject matter may be thorough and complete, and that the spirit of the present invention may be sufficiently conveyed to those skilled in the art.

The embodiments described and illustrated herein also include complementary embodiments thereof.

An expression in the singular encompasses the expression in the plural, unless it has a clearly different meaning in context. As used herein, the terms "comprise" and/or "comprising" do not exclude the presence or addition of one or more other components.

Hereinafter, the present invention will be described in detail with reference to the drawings. In describing the specific embodiments below, various specific details have been prepared to more specifically explain and aid in understanding of the invention. However, a reader having enough knowledge in this field to understand the present invention can recognize that it can be used without these various specific details. In some cases, it is mentioned in advance that parts that are commonly known and not largely related to the invention in describing the invention are not described in order to avoid confusion in describing the invention.

Hereinafter, a method of manufacturing yoga outer socks with a silicone band attached thereto according to the present invention will be described in detail with reference to the accompanying drawings.

Figure 1:
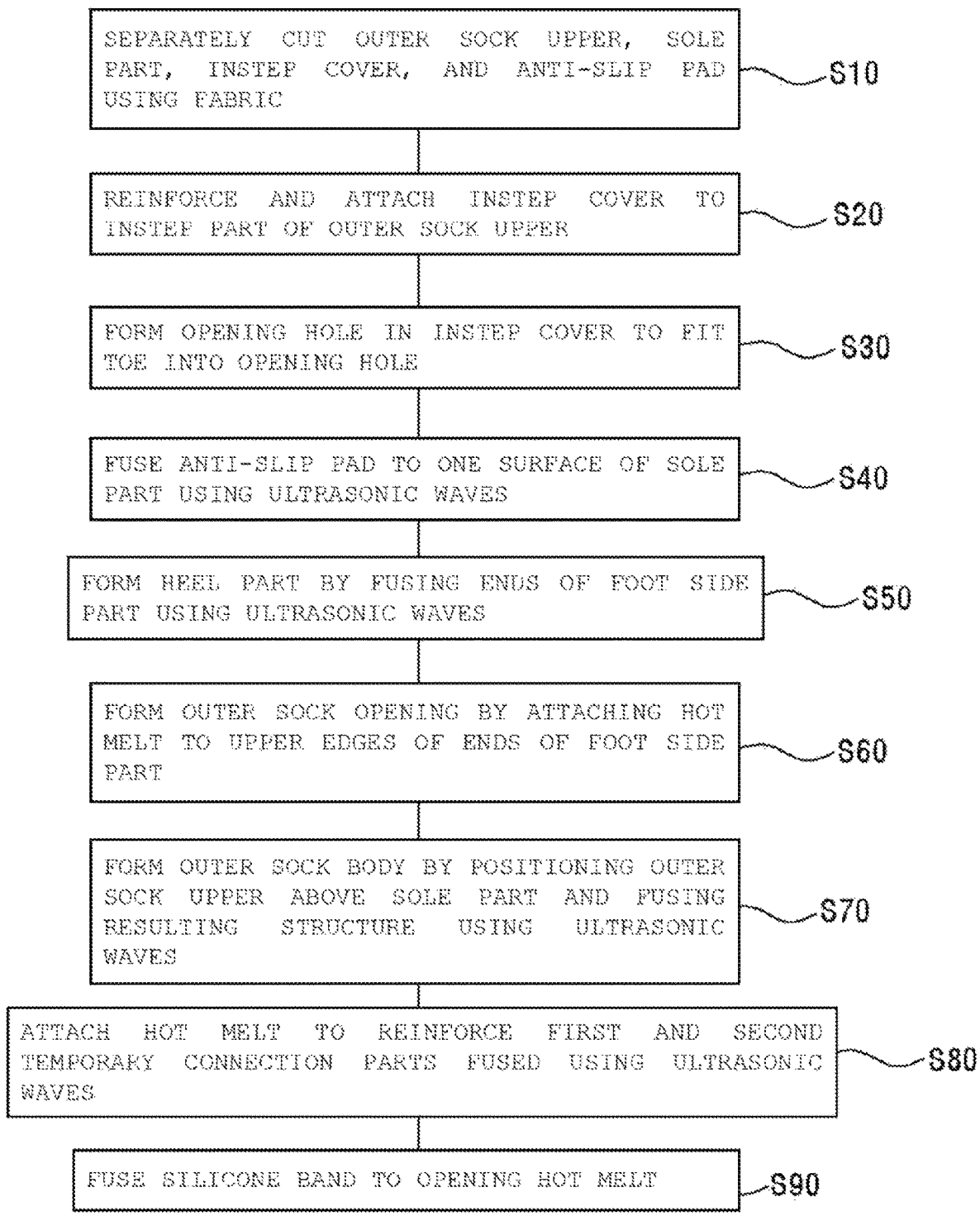
FIG. 1 is a process chart showing a method of manufacturing yoga outer socks with a silicone band attached thereto according to the present invention.
Figure 2:
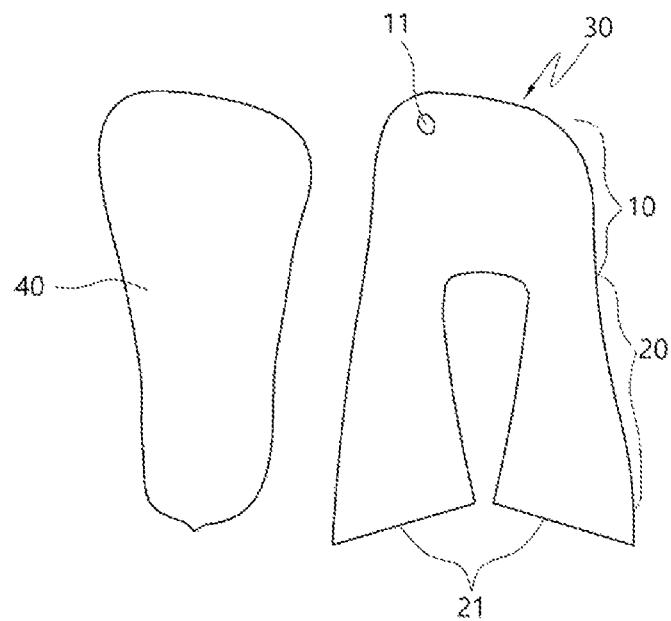
FIG. 2 is a diagram showing an outer sock upper and a sole part according to the present invention.
Figure 3:
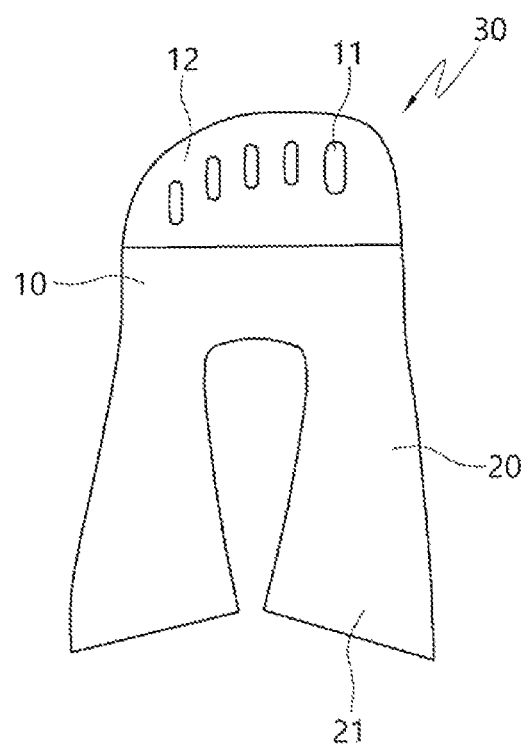
FIG. 3 is a diagram showing the state in which an instep cover is attached to an outer sock upper and a toe opening hole is formed according to the present invention.

FIG. 1 is a process chart showing a method of manufacturing yoga outer socks with a silicone band attached thereto according to the present invention, FIG. 2 is a diagram showing an outer sock upper and a sole part according to the present invention, and FIG. 3 is a diagram showing the state in which an instep cover is attached to an outer sock upper and a toe opening hole is formed according to the present invention.

Figure 4:
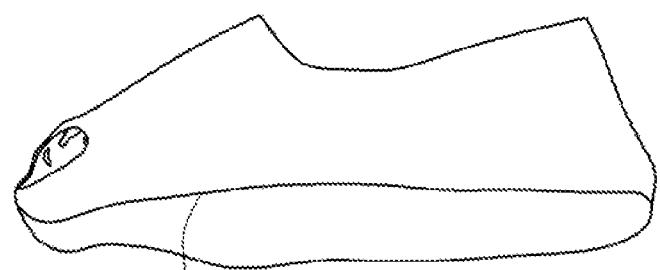
FIG. 4 is a diagram showing a first temporary connection part and a second temporary connection part according to the present invention.
Figure 4:
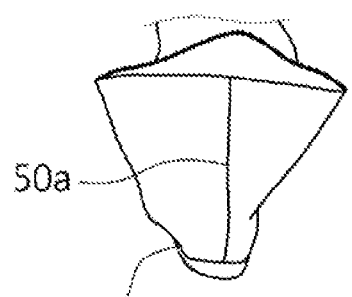
Figure 5:
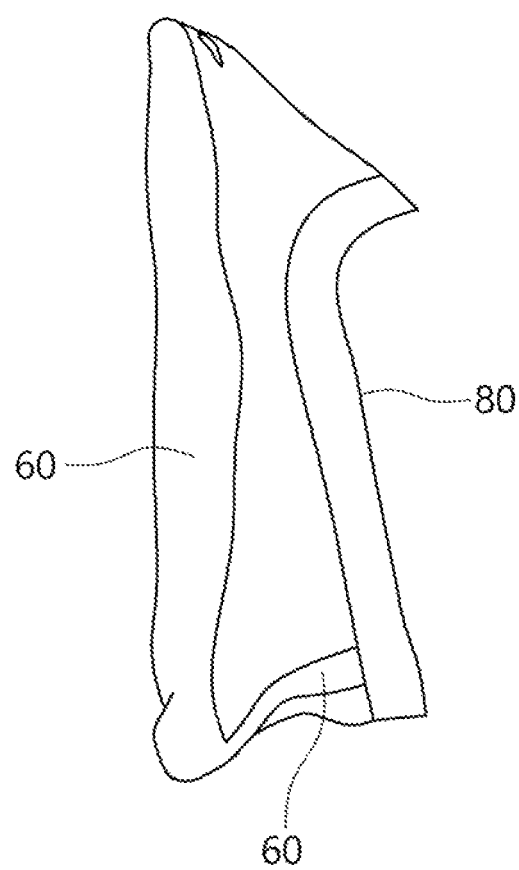
FIG. 5 is a diagram showing the state in which hot melt is bonded to a first temporary connection part and a second temporary connection part according to the present invention.
Figure 6:
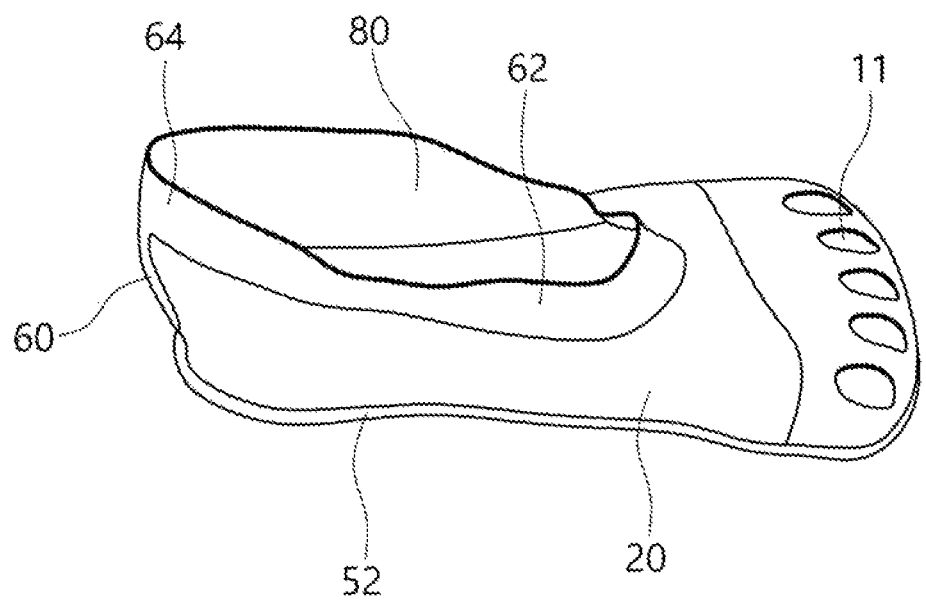
FIG. 6 is a configuration diagram showing completed yoga outer socks with a silicone band attached to a hot melt opening according to the present invention.

FIG. 4 is a diagram showing a first temporary connection part and a second temporary connection part according to the present invention, FIG. 5 is a diagram showing the state in which hot melt is bonded to a first temporary connection part and a second temporary connection part according to the present invention, and FIG. 6 is a configuration diagram showing completed yoga outer socks with a silicone band attached to a hot melt opening according to the present invention.

Figure 7:
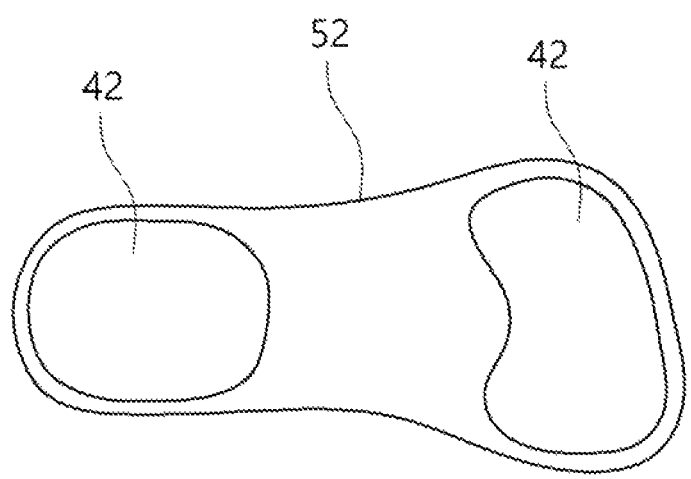
FIG. 7 is a diagram showing the state in which an overlock is formed on a second temporary connection part according to the present invention.
Figure 8:
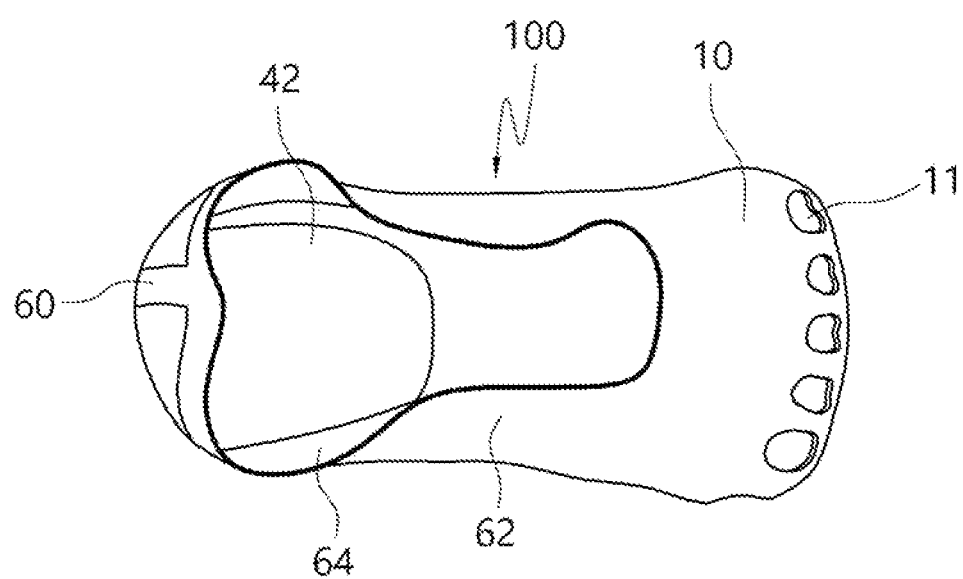
FIG. 8 is a diagram showing the state in which an anti-slip pad is fused to an inner surface of a sole part with hot melt according to the present invention.
Figure 9:
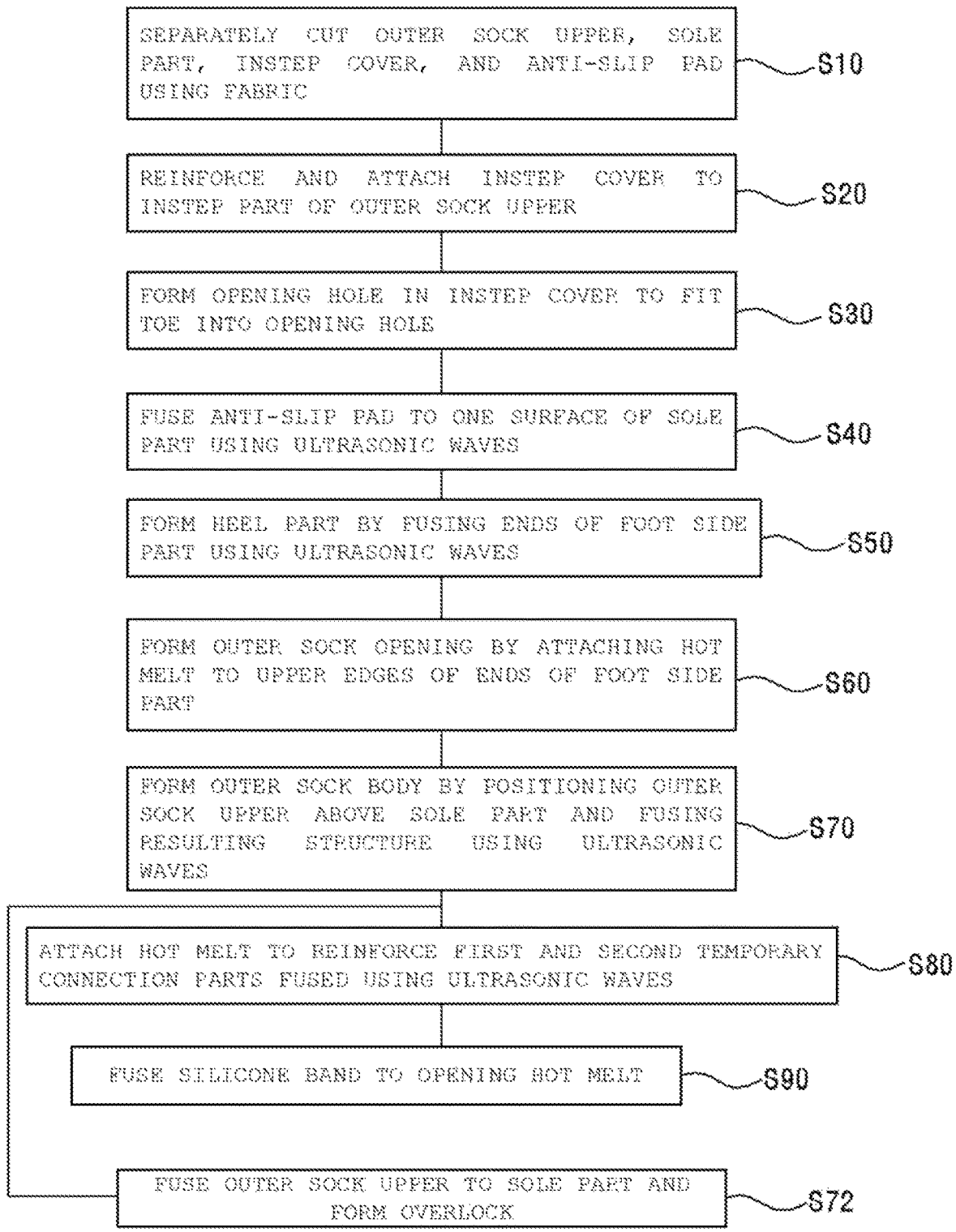
FIG. 9 is a process chart according to another embodiment of the present invention.

FIG. 7 is a diagram showing the state in which an overlock is formed on a second temporary connection part according to the present invention, FIG. 8 is a diagram showing the state in which an anti-slip pad is fused to an inner surface of a sole part with hot melt according to the present invention, and FIG. 9 is a process chart according to another embodiment of the present invention.

First, as shown in FIGS. 1 to 9, according to the present invention, a temporary connection part may be formed with ultrasonic waves without a seam between the outer sock upper and the sole part and then hot melt may be bonded to the temporary connection part via heat fusion, thereby simplifying a manufacturing process, and a silicone band is fused to hot melt attached to the outer sock opening, thereby preventing slipping.

Referring to FIGS. 1 to 9, the method of manufacturing yoga outer socks with a silicone band attached thereto according to the present invention may include operations S10 to S90.

First, operation S10 is an operation of separately cutting an outer sock upper, a sole part, an instep cover, and an anti-slip pad using fabric.

The operation of cutting fabric is an operation of separately cutting an instep part 10, an outer sock upper including a foot side part 20 branched and extended from both sides of the instep part 10, a sole part 40 coupled to the outer sock upper 30, an instep cover 12 for reinforcing the instep part 10 included in the outer sock upper 30, and an anti-slip pad 42.

In this case, the outer sock upper 30 is cut to form the instep part 10 and the foot side part 20 branched and extended from both sides of the instep part 10 as single fabric.

The outer sock upper 30 may be configured in such a way that ends of the foot side part 20 are adhered to each other to configure a heel part 21 while being positioned upright in a vertical direction, and thus separate fabric for the heel part 21 is not required, thereby simplifying a manufacturing process.

The ends of the foot side part 20, which constitute the heel part 21, need to be previously cut gradually wider to increase the height of the heel part 21 depending on the heel of the human body, thereby preventing the yoga outer socks 100 from coming off.

The sole part 40 may be a part that is in contact with the sole, and thus the sole part 40 may be cut to widen a front side thereof and to narrow a rear side thereof corresponding to the shape of the foot as much as possible, and the anti-slip pad 42 may be cut to be adhered to each of a heel part and a toe part.

Operation S20 may be an operation of reinforcing and adhering the instep cover to the instep part of the outer sock upper, and in this case, in order to reinforce the instep part 10 of the outer sock upper 30, in the state in which the instep cover 12 is cut using fabric, the instep part 10 may be reinforced by spraying an adhesive to an adhesive surface of the instep cover 12 and then superimposing the adhesive surface of the instep cover 12 on the instep part 10 and pressing the resulting structure with a heat press.

Operation S30 may be an operation of forming an opening hole in the instep cover to fit the toe into the opening hole, and in this case, five toe opening holes 11 may be formed to expose toes therethrough using a punch in the instep cover 12 superimposed on the instep part 10 included in the outer sock upper 30.

In this case, the method may further include an operation of melting and heat treating part of the toe opening holes 11 using ultrasonic waves to prevent the toe opening holes 11 from coming loosing.

Operation S40 may be an operation of fusing the anti-slip pad on one surface of the sole part using ultrasonic waves, and in this case, at least one anti-slip pad 42, in detail, a heel pad and a toe pad may be cut, the heel pad may be fusion-bonded to an inner surface of the sole part 40 using ultrasonic waves, and the toe pad may be fusion-bonded to an inner surface of the sole part 40 using ultrasonic waves.

Operation S50 may be an operation of forming a heel part by fusing ends of the foot side part using ultrasonic waves, and in this case, a structure in which two ends of the foot side part 20 branched from the instep part 10 of the outer sock upper 30 are positioned upright in a vertical direction and are superimposed may be put into an ultrasonic adapter, and the heel part 21 may be formed through a first temporary connection part 50*a* that is temporarily fused while the superimposed parts are cut via oscillation using ultrasonic waves.

Here, the first temporary connection part 50*a* formed by adhering the ends of the foot side part 20 may be formed by partially superimposing adhering lines of the two ends of the foot side part 20 and then temporarily adhering the ends while melting and cutting the superimposed part with a basic material using ultrasonic waves oscillated by an ultrasonic adapter.

In this case, while the heel part 21 is formed, an outer sock opening 80 may be simultaneously and smoothly formed above the outer sock upper 30 to put the feet therein.

Then, operation S60 may be an operation of forming an outer sock opening by attaching hot melt to upper edges of the ends of the foot side part, and in this case, in order to reinforce the outer sock opening 80 formed by adhering the ends of the heel part 21 of the outer sock upper 30, a hot melt 60 may be elastically attached to the upper edges of the ends of the foot side part 20 to hold the ankle without slipping and to prevent the foot from coming out easily.

Operation S60 may be selectively performed prior to operation S50, and it would be obvious to change the order of these operations depending on the situation of an operator.

Subsequently, operation S70 may be an operation of forming an outer sock body by positioning the outer sock upper above the sole part and fusing the resulting structure using ultrasonic waves, and in this case, a structure in which the outer sock upper 30 is stacked on the sole part 40 may be put into an ultrasonic adapter, a second temporary connection part 50*b* may be formed to be temporarily fused while edges of the superimposed parts are cut corresponding to a foot size via oscillation using ultrasonic waves, and the outer sock upper 30 and the sole part 40 may be integrated with each other to form the outer sock body.

As such, the second temporary connection part 50*b* may be formed using ultrasonic waves to remove a separate cutting operation, and an operation of aligning a boundary surface of the sole part 40 with a boundary surface of the outer sock upper 30 may be removed, and thus the number of manufacturing processes may be reduced, thereby rapidly performing the method.

Operation S80 may be an operation of attaching hot melt in order to reinforce first and second temporary connection parts fused using ultrasonic waves, and in this case, in order to prevent the adhesive surfaces of the first and second temporary connection parts 50*a* and 50*b* from being opened, the heel hot melt 60 and the sole hot melt 61 may be attached to the first and second temporary connection parts 50*a* and 50*b*, respectively, and may be pressurized with a heat press to thermally fuse the heel hot melt 60 and the sole hot melt 61 and to attach the heel part of the outer sock upper, and the sole part 40 of the outer sock upper may be attached thereto to elastically reinforce the first and second temporary connection parts 50*a* and 50*b*.

The heel hot melt 60 and the sole hot melt 61 may be thermally fused to reinforce the first and second temporary connection parts 50*a* and 50*b*, and thus the heel hot melt 60 and the sole hot melt 61 may be integrally adhered to each other to reinforce the adhesive surfaces of the first and second temporary connection parts 50*a* and 50*b* using heat and pressure using a material formed by attaching an adhesive layer to a polyurethane layer.

An opening hot melt 62 may also be attached to an edge of an upper surface of the outer sock opening of the outer sock upper to reinforce the same.

Operation S90 may be an operation of fusing the silicone band to the opening hot melt, and in this case, the opening hot melt 62 may be attached and formed on the outer sock opening formed in the outer sock upper, and thus a silicone band 64 may be fused to a part of the opening hot melt 62, in which the heel is positioned, and may be elastically reinforced, thereby preventing the heel from slipping and coming off.

Operation S72 may be an operation of fusing the outer sock upper to the sole part and forming an overlock and may further include an operation of forming the overlock and strongly fixing the second temporary connection part 50*b*, which is temporarily attached with ultrasonic waves in the state in which the sole part 40 is attached to the outer sock upper 30, to prevent the second temporary connection part 50*b* from being opened, and the yoga outer socks with a silicone band attached thereto may be completed through this operation.

Operation S72 may be changed depending on operations depending on the situation of an operator, and the overlock may also be formed on the first temporary connection part 50*a*.

The method may further include an operation of attaching a circular elastic band to which an adhesive is spayed in the form of a concentric circle to the sole part from the instep part 10 to the outer sock body as configured above via pressurization with a heat press in the state in which the sole part 40 and the outer sock upper 30 are upside down, and in this case, the elastic band may fasten the toe, that is, an upper part of the toe to prevent the yoga outer socks 100 from coming off and to improve feelings of wearing.

The elastic band may be a circular rubber band, a narrow band, a wide band, a string type band, or the like and may be used by attaching at least two or more lines.

According to the present invention, yoga outer socks may be manufactured by forming a temporary connection part with ultrasonic waves without a seam and then adhering hot melt to the temporary connection part via heat fusion to simplify manufacturing processes and to achieve excellent productivity.

In addition, a silicone band may be further fused to a hot melt opening of an outer sock opening to prevent the outer socks from coming off, and thus a user may do yoga without slipping, and the outer socks include only an outer sock upper and a sole part, and thus manufacturing processes may be simplified and excellent workability may be achieved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS

| 10: | instep part | 11: | opening hole |
|---|---|---|---|
| 12: | instep cover | 20: | foot side part |
| 21: | heel part | 30: | outer sock upper |
| 40: | sole part | 50a: | first temporary connection part |
| 50b: | second temporary connection part | | |
| 52: | overlock | | |
| 60: | hot melt | 62: | opening hot melt |
| 70: | elastic band | 71: | cut line |
| 72: | cut region | 80: | outer sock opening |
| 100: | yoga outer socks | | |

What is claimed is:

1. A method of manufacturing yoga outer socks with a silicone band attached thereto, the method comprising:

separately cutting an outer sock upper including an instep part, a sole part, an instep cover for reinforcing the instep part, and at least one anti-slip pad using fabric;

reinforcing and adhering the instep cover to the instep part of an outer sock upper to be superimposed;

forming an opening hole in the instep cover adhered to the instep part to fit a toe thereinto;

attaching the at least one anti-slip pad to one surface of the sole part to be in contact with a heel part and a toe part of a sole by fusing the anti-slip pad to the one surface of the sole part using ultrasonic waves;

forming a first temporary connection part by adhering ends of a foot side part of the outer sock upper to fuse the ends to the heel part using ultrasonic waves while melting and cutting a superimposed part of the ends by oscillating ultrasonic waves by putting a structure in which the ends of the foot side part are partially superimposed into an ultrasonic adapter;

forming an outer sock opening by attaching hot melt to an upper edge of the foot side part;

forming an outer sock body by putting the outer sock upper above the sole part and fusing a resulting structure using ultrasonic waves to provide a second temporary connection part;

attaching hot melt to the first temporary connection part formed on the heel part of the outer sock upper and the second temporary connection part formed on the outer sock upper and the sole part to reinforce the first temporary connection part and the second temporary connection part; and fusing a silicone band to the hot melt on the heel part of the outer sock upper.

2. The method according to claim 1, further comprising:

stacking the outer sock upper on an upper surface of the sole part to fuse a resulting structure and forming an overlock on a fused part to strongly fix the sole part and the outer sock upper.

3. The method according to claim 1, further comprising:

attaching an elastic band to an upper part of the toe part of the outer sock upper via heat pressurization to be elastically extended and contracted and to simultaneously prevent the yoga outer socks from easily coming off.

* * * * *